United States Patent [19]

Bergsten et al.

[11] 4,291,634
[45] Sep. 29, 1981

[54] SOLID REFUSE DISPOSAL APPARATUS

[75] Inventors: Victor E. Bergsten, East Amherst; Edward P. Eardley, Getzville; Thomas G. Halvorson, Lockport, all of N.Y.

[73] Assignee: Union Carbide Corporation, New York, N.Y.

[21] Appl. No.: 154,519

[22] Filed: May 29, 1980

[51] Int. Cl.³ .......................... F23G 7/00; C21B 7/00; F27B 1/10
[52] U.S. Cl. .................................. 110/235; 110/238; 110/229; 432/99; 266/227; 266/900
[58] Field of Search ............... 110/229, 235, 238, 245, 110/253, 182.5; 432/96, 99; 266/166, 200, 227, 900

[56] References Cited

U.S. PATENT DOCUMENTS

| 1,348,525 | 8/1920 | Ward . | |
|---|---|---|---|
| 1,439,957 | 12/1922 | Garred . | |
| 1,880,012 | 9/1932 | Brassert et al. . | |
| 1,948,696 | 2/1934 | Brassert et al. . | |
| 3,630,508 | 12/1971 | Stookey . | |
| 3,801,082 | 4/1974 | Anderson | 266/900 |
| 3,996,044 | 12/1976 | Petritsch | 75/10 R |
| 4,002,422 | 1/1977 | Escott | 432/99 |
| 4,033,562 | 7/1977 | Collin | 266/900 |
| 4,077,338 | 3/1978 | Halvorson et al. | 110/235 |

Primary Examiner—Henry C. Yuen
Attorney, Agent, or Firm—John C. LeFever; Stanley Ktorides

[57] ABSTRACT

Apparatus for disposing of pelletized refuse by conversion into useful gaseous products and inert solid residue, comprising a vertical shaft and an enlarged hearth beneath the shaft, with a multiplicity of tuyeres for feeding oxygen-containing gas into the hearth.

6 Claims, 6 Drawing Figures

SOLID REFUSE DISPOSAL APPARATUS

BACKGROUND OF THE INVENTION

1. Field of the Invention

This invention relates to solid refuse disposal, and more particularly to a vertical shaft-hearth type furnace for converting pelletized refuse into useful gaseous product and inert solid residue.

2. Description of the Prior Art

Anderson U.S. Pat. No. 3,729,298 describes a solid refuse disposal process which has as products a useful fuel or synthesis gas and an inert solid residue. The Anderson process involves the introduction of refuse into the top of a vertical shaft, refractory-lined furnace with the simultaneous introduction of an oxygen-enriched gas into the base of the furnace. The refuse forms a porous packed bed within the vertical shaft which can be analyzed in terms of three functional zones: a drying zone at the top section, a pyrolysis zone in the midsection, and a combustion or melting zone (the hearth) at the base of the furnace. Apparatus useful for practicing the Anderson process is also described in U.S. Pat. Nos. 3,801,082 and 3,985,518 to Anderson.

As the refuse descends through the shaft under the influence of gravity, it is first dried by hot rising gases which are generated in the lower shaft and hearth sections of the furnace. These gases are cooled as they give up their heat to the refuse. As the at least partially dried refuse descends further into the shaft furnace, it is exposed to still higher temperatures resulting in the pyrolysis of the organic content of the refuse. During the pyrolysis phase, the combustible organic material is decomposed in the presence of a hot oxygen-deficient (reducing) atmosphere to a solid char residue and a gaseous mixture consisting predominantly of carbon monoxide, hydrogen and a variety of hydrocarbons. The gaseous mixture rises from the pyrolysis zone while the char and remaining non-volatile inorganic materials descend into the combustion and melting zone or hearth.

In the hearth, the char, which is composed primarily of fixed carbon and ash, is reacted exothermically (combusted) with an oxygen-enriched gas which is fed into the hearth through a plurality of tuyeres. As described in the afore-mentioned Anderson prior art, the tuyeres are radially oriented and are positioned in the lower half of the hearth, just above the slag pool. The heat generated by this exothermic reaction melts any inorganic materials which are present so as to form a molten slag which is continuously tapped or removed from the base of the furnace. The hot gaseous product produced by the exothermic reaction (combustion), consisting primarily of a mixture of carbon oxides, rises into the pyrolysis zone and drives the endothermic reactions occurring therein.

One problem encountered during the initial large scale practice of the Anderson process with shredded refuse was excessive compaction of the vertical refuse bed. Such compaction leads to uneven gas flow through the bed and an attendant decrease in the overall efficiency. It was subsequently discovered that by compacting the refuse into small pellets for feeding into the vertical shaft furnace, many of the problems encountered when operating with shredded refuse could be eliminated. This so-called pelletized refuse process is described and claimed in Anderson U.S. Pat. No. 4,042,345 and significantly improves the overall operation of the basic process.

Even though the pelletized refuse modification of the basic Anderson process has yielded a refuse disposal system that effectively achieves the basic goals of the original process, i.e., the continuous production of a fuel gas and a clean, inert slag residue, one problem still remains. During extended operation of the Anderson pelletized process, it has been observed that some of the char produced within the pyrolysis zone is not sufficiently combusted within the hearth and is entrained in the upwardly flowing gases. This char is accordingly carried out of the vertical shaft furnace with the product gas. While this char entrainment problem does not appear to deleteriously affect the basic function of the process, it does add considerable expense to the system by complicating the fuel gas cleaning apparatus and requiring an additional sub-system for the recycle of the char back into the shaft furnace. Therefore, it would be desirable to reduce or preferably eliminate the problem of char entrainment.

An object of the present invention is to provide a vertical shaft-hearth type furnace for pelletized refuse which reduces the overall level of char entrainment in the gaseous product.

Another object of this invention is to provide a refuse disposal furnace having an improved hearth configuration which provides more complete combustion of the char produced in the pyrolysis zone, thereby contributing to a reduction in char entrainment.

Other objects and advantages of this invention will be apparent from the ensuing disclosure and appended claims.

SUMMARY

This invention relates to apparatus for disposing of pelletized refuse by conversion to useful gaseous product and inert solid residue. The apparatus includes a vertical shaft with an upper end for pelletized refuse introduction which provides a drying zone in the top section and a thermal decomposition zone in the intermediate section thereof to form a pelletized refuse bed. The hearth is beneath the shaft and in flow communication with the lower end of the shaft. Means are provided for feeding oxygen-containing gas into the hearth as a combustion zone. A taphole communicates with the hearth for discharging molten residue therefrom.

More specifically, the improvement comprises:

(a) a hearth volume V (ft$^3$) which is greater than that defined by the following Equation (1):

$$V = 7.28 \times 10^2 G_r D_s^2 / P_g \qquad (1)$$

where $G_r$ = pelletized refuse maximum feed rate (lb. refuse/ft$^2$ shaft minimum cross-sectional area/second), $D_s$ = shaft minimum equivalent diameter (ft), and $P_g$ = minimum furnace pressure (psia).

(b) an opening connection between the shaft and the hearth having minimum cross-sectional area between 0.044 and 1.0 times the shaft minimum cross-sectional area, (c) a multiplicity of tuyeres as the means for feeding oxygen-containing gas into the hearth, each positioned at circumferentially spaced locations in the upper part of the hearth adjacent to the shaft-hearth connection (b) which are less than 35% of the vertical distance from the shaft-hearth connection (b) mid-point to the hearth floor, with (d) the tuyeres inclined downwardly and away from the shaft-hearth connection (b) and directed so that the oxygen-containing gas does not impinge directly against the pelletized refuse bed.

As used herein, the term "refuse" includes not only conventional municipal refuse and garbage which commonly contains combustible material such as wood, food waste and non-combustible materials such as metal and glass, but also other materials including but not limited to such materials as coal, sawdust, wood chips and bagasse, which contain a substantial organic and therefore pyrolyzable fraction.

Also with respect to this invention, the expression "pelletized refuse" includes not only refuse which has been compacted into a cylindrical or other shaped block using an apparatus such as that disclosed in Pelton U.S. Pat. No. 4,133,259, but also refuse such as wood which in it raw state may satisfy the pelletation requirements of the aforementioned Anderson U.S. Pat. No. 4,042,345.

As used herein, the term "shaft" refers to a hollow column which may, but need not, have uniform cross-sectional area from end-to-end.

DETAILED DESCRIPTION

Figure 1:
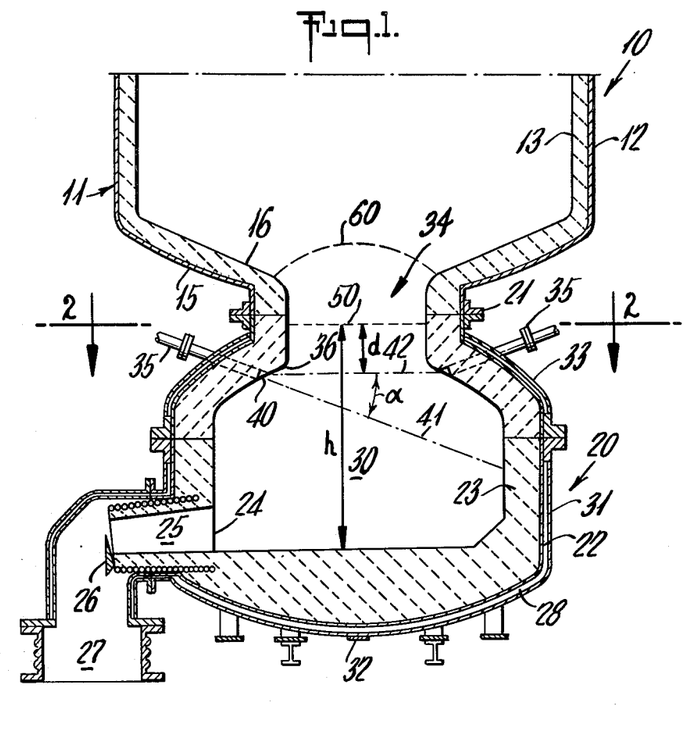
FIG. 1 is a vertical cross-sectional view of the lower portion of the vertical shaft and the hearth of a furnace in accordance with one embodiment of this invention, constructed such that the pelletized refuse bed is supported on the shaft lower end.

Referring to FIG. 1, the furnace 10 consists of a vertical shaft 11 and a hearth 20. The vertical shaft 11 is composed of a metal shell 12 and a refractory lining 13. If desired, the metal shell can be water-cooled in any known manner. It should be understood that the upper end of the vertical shaft 11 (not shown) is provided with means for feeding a pelletized refuse charge into the furnace as well as with means for removing the gaseous products generated within the furnace 10. Suitable apparatus for performing these functions is, for example, disclosed in the aforementioned Anderson U.S. Patents.

The lower end of the vertical shaft 15 is sloped inwardly at 16 to form a restricted hearth opening connection 34. The hearth 20 is supported from and removably connected to the restricted hearth opening connection 34 of the vertical shaft 11 through annular flange 21. This construction is convenient from the standpoint of furnace repair and maintenance. The hearth 20 is also composed of a metal shell 22 and a refractory lining 23. The hearth 20, in particular, is preferably lined with a higher quality refractory than the vertical shaft 11 to conserve heat and withstand the higher temperature prevailing in the hearth. To ensure a long refractory life, the shell of the hearth 20 is also preferably encased in a water-cooled jacket 28. Cooling tends to minimize erosion of the refractory due to the high temperature and severe corrosive conditions prevalent in the hearth. A tapping hole 24 is provided in the base of the hearth 20 for removing slag produced during the operation of the furnace 10. The slag flows out of the hearth through the tapping hole 24 and through the water-cooled slag duct 25. The slag then flows over a slag weir 26 and falls through the slag discharge tube 27 for subsequent quenching.

The hearth 20 is provided with an enlarged volume 30 enclosed by vertical side wall 31 and inwardly inclined dish-shaped ends 32 and 33. The upper dish-shaped end 33 of the hearth 20 is connected to the vertical shaft 11 at the restricted hearth opening connection 34. In the upper part of the hearth volume 30, a plurality of tuyeres 35 are provided. The tuyeres are supplied with an oxygen-containing gas from an appropriate oxygen header (not shown). Preferably, the flow of oxygen-containing gas to each tuyere is separately controllable. As a result, the operator has the option of manipulating and altering the gas flow circulation pattern established by the tuyeres in the hearth. Each tuyere 35 is positioned at circumferentially spaced-apart locations in the upper part of the hearth 20, adjacent to the restricted shaft-hearth opening connection 34.

Preferably, the tuyeres 35 are located at the base 36 of the shaft-hearth restricted opening connection 34. The tuyeres 35 are inclined downwardly at an angle of inclination $\alpha$ away from the restricted hearth opening connection 34. The angle of inclination is preferably in the range of 10 to 45 degrees.

In its broadest aspect, the shaft-hearth opening connection 34 has a minimum cross-sectional area between 0.044 and 1.0 times the shaft 11 minimum cross-sectional area. In the FIG. 1 embodiment, the shaft-hearth opening connection 34 is "restricted" in the sense of being substantially smaller in cross-sectional area than the vertical shaft cross-sectional area, i.e. the aforementioned cross-sectional area ratio is less than 1.0. This relationship, coupled with the inwardly sloped lower end 16 of the vertical shaft joining connection 36, permits the latter to function as a support for the pelletized refuse bed 60.

As compared with a construction in which the pelletized refuse bed is supported on the hearth floor, the FIG. 1 preferred embodiment is more able to prevent the falling of partially pyrolized material into the slag bath. This would exert an undesirable cooling effect on the bath and hearth and thereby possibly result in slag plugging of tapping hole 24. On the other hand, if the aforementioned cross-sectional area ratio is too small, the velocity of the rising gas may be sufficiently high to create unacceptably high char carryover in the gaseous product discharged from the shaft upper end. A restricted opening to shaft cross-sectional area ratio of between 0.075 and 0.2 represents a preferred balance of these considerations for the FIG. 1 embodiment.

A generic requirement for the invention is that tuyeres 35 be oriented so as not to impinge directly against this bed. Since the tuyeres are positioned on the opposite side of shaft-hearth connection 34 and laterally isolated from the pelletized refuse bed 60 by the shaft connection base 36, direct impingement by the oxygen-containing gas is prevented. This construction also prevents the tuyeres from being fouled or plugged by molten slag descending from the pelletized refuse bed 60.

Figure 2:
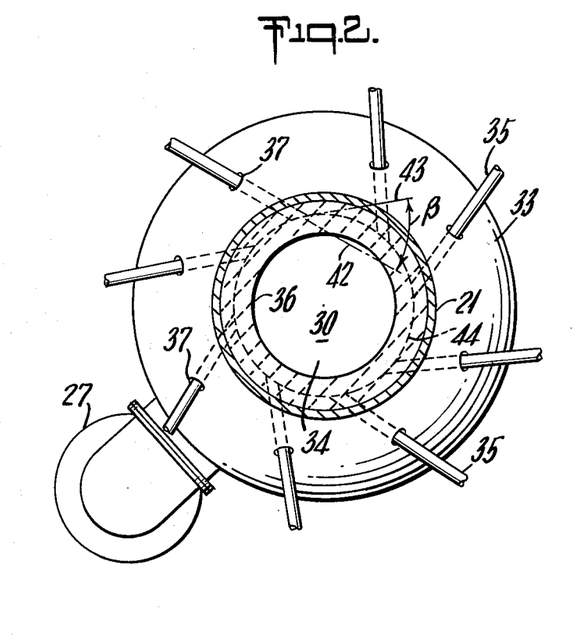
FIG. 2 is a plan view looking downwardly along line 2—2 of FIG. 1 illustrating in partial cross-section the tuyere location and orientation in the hearth.

The orientation of tuyeres 35 (and the oxygen-containing gas discharged therefrom) relative to the refuse pellets entering hearth 20 is also illustrated in FIG. 2. In this embodiment of the invention, all of the tuyeres 35 are transversely positioned in an approximately tangential orientation with respect to the shaft-hearth opening connection 34. As used herein an "approximately tangential orientation" means that the angle $\beta$ formed between the transverse orientation of the axis of the tuyeres 35 (defined by line 42, which is a projection of the extended transverse axis 41 of each tuyere 35 onto the transverse plane of the level of the tuyeres) and a true tangent 43 to a circle 44 inscribed in the hearth at the transverse level of the tuyeres when viewed with respect to the plane of the restricted hearth opening (see FIG. 2) is less than 60 degrees. For example, if the hearth has a circular cross-section at the level of the tuyeres and the tuyeres have a radial orientation, the above angle, $\beta$, is 90 degrees. In preferred practice, the angle $\beta$ is about 25 to 30 degrees.

As shown in FIG. 2, the hearth is provided with eight circumferentially spaced tuyeres 35. In preferred practice, as many tuyeres are provided spaced circumferentially around the hearth as can be physically accommodated in the space available. Each tuyere 35 is directed downwardly and passes through an opening 37 in the upper dish-shaped end 33 of the hearth 20.

As previously indicated, tuyeres 35 must also be positioned at locations in the upper part of the hearth at location(s) which are less than 35% of the vertical distance from the shaft-hearth opening connection 34 middle (in the transverse direction) to the hearth floor. In FIG. 1, horizontal dash line 50 defines the middle of opening 34 in the vertical direction. Horizontal dash line 42 represents the center of the tuyere mouth into the hearth upper part, so that the vertical distance from line 50 to line 42 defines the absolute vertical displacement "d" of the tuyeres into the hearth volume. This displacement "d" divided by the vertical distance "h" from line 50 to the hearth floor 51 multiplied by one hundred is the basis for the previously referenced less than 35% vertical displacement requirement in the FIG. 1 embodiment. As illustrated, the d/h (100) value in FIG. 1 is about 23%.

The tuyeres are positioned within the hearth in the aforedescribed manner for primarily two reasons. Elevation of the tuyeres minimizes the problem of slag plugging which was especially troublesome with the prior art Anderson design disclosed in U.S. Pat. Nos. 3,801,082 and 3,985,518 wherein the tuyeres were positioned in the lower half of the hearth proximate the slag pool. Secondly, and most importantly, the tuyeres are located adjacent to the shaft-hearth connection so as to exert an immediate influence on all combustible materials which pass into the hearth. As will be discussed in more detail hereafter, one of the principal functions of the hearth construction and tuyere orientation combination of this invention is to prolong the retention time of combustible material in the hearth. The long retention time provides more complete char combustion and an attendant decrease in char entrainment. By so positioning the tuyeres, the char descending into the hearth is urged into the circulating gases of the hearth rather than merely relying on gravity to cause char flow into the hearth.

A major advantage to be gained by disposing the tuyeres in a manner indicated in the FIGS. 1 and 2 embodiment is that a cyclonic flow of combustion-supporting gases is created in the upper annular region of the hearth below the hearth opening connection 34. This cyclonic flow of combustion-supporting gases exerts an influence on the entire hearth volume by prolonging the retention time of char particulates which have descended into the hearth. Due to their own inertia in the cyclonic flow pattern, these char particulates tend to remain in the bulk swirling gases instead of flowing with the gaseous products that emanate from the cyclone and flow upwardly through the shaft furnace. As a result, the char is more completely combusted in the hearth and the quantity and size of char particulates which are eventually entrained within the upwardly flowing gases are greatly reduced.

While the approximated tangential orientation of the tuyeres as illustrated in FIG. 2 is preferred, the FIG. 1 embodiment of the invention is also operable with a radial tuyere orientation or any orientation between tangential and radial. The key requirements in this regard are that the tuyere gas discharge not impringe directly against the bed of pelletized refuse supported above the restricted hearth opening 34 and that the tuyere outflows establish an appropriate circulation of gas in the hearth which tends to retain combustible materials in the hearth for extended periods. Direct tuyere gas impingement against the furnace charge, although a standard operating technique for blast furnace operation, is undesirable and avoided in the present invention. Because the apparatus of the present invention is constructed to preferably operate with an enriched-oxygen gas feed for the tuyeres, the flow rate of gas discharging from each tuyere is much smaller than the tuyere outflows in blast furnaces which typically operate with a preheated air feed. As a result, any interference with the tuyere gas discharge flows, such as caused by direct impingement, significantly dissipates and probably eliminates any effective gas circulation established by the tuyeres. Although a tangential tuyere orientation tends to especially benefit the establishment of a highly effective cyclonic gas circulation pattern particularly in combination with the proper angle of inclination, $\alpha$, of the tuyeres, an appropriate circulation pattern is also developed in the FIG. 1 embodiment if the tuyeres are oriented off the tangent and even if the tuyeres are oriented in a radial plane. For example, the combination of an appropriate angle of inclination $\alpha$ such as 20 degrees and a radial tuyere orientation, $\beta=90$ degrees, creates a toroidal gas flow pattern in which the gas flows downwardly in the interior portion of the hearth volume and upwardly near the wall. This flow pattern also tends to prolong the residence time of combustible materials (char) in the hearth. Obviously, a tuyere orientation between these two extremes (i.e., tangential and radial positioning) will create some hybrid of the cyclonic and toroidal gas circulation patterns.

In combination with this aforedescribed tuyere orientation, this invention also requires that the hearth itself have a volume equal to or greater than that defined by Equation (1) as follows:

$$V = 7.28 \times 10^2 G_r D_s^2 / P_g \qquad (1)$$

where $G_r$ = pelletized refuse maximum feed rate (lb. refuse/ft² shaft minimum cross-sectional area/second), $D_s$ = shaft minimum equivalent diameter (ft), and $P_g$ = shaft minimum operating pressure (psia).

It should be noted that in Equation (1) $G_r$ is the pelletized refuse maximum feed rate, i.e., the maximum rate at which the apparatus may operate for a sustained period of time at maximum efficiency in terms of BTU value in the product gas, percent combustion of the char, minimum char carryover in the product gas, and oxygen utilization. Normally this maximum feed rate is specified in the design criteria for a solid refuse disposal system. It will be apparent from the nature of Equation (1) that if the hearth volume is sized on the basis of this Equation and the system is periodically operated at lower than maximum pelletized refuse feed rate, operation may be continued at a highly efficient level by proportionately reducing the oxygen-containing gas feed rate to the tuyeres.

Equation (1) also specifies $G_r$ in terms of the shaft minimum cross-sectional area. This is because the pelletized refuse feed rate is flow limited by the minimum cross-sectional area. Similarly, the shaft width $D_s$ is in terms of minimum equivalent diameter, so that a non-circular cross-section is converted to this basis. This dimension is on a "minimum" basis for the same reason $G_r$. The shaft minimum operating pressure $P_g$ (psia) refers to the design pressure in the upper section and will be at least slightly above atmospheric. As hereinafter discussed, the pelletized refuse disposal apparatus of this invention is preferably operated by pressure substantially above atmospheric.

The satisfaction of this vertical shaft-dimensional hearth requirement is necessary if complete advantage of all of the benefits to be derived from the previously described tuyere orientation are to be realized. The hearth volume, in connection with the refuse processing rate, controls the rate at which the combustion gas products flow from the body of circulating gas established in the hearth. If the volume is too low, then the expiration rate of the combustion product gases is high and the char retention time in the hearth is disadvantageously reduced causing excessive char entrainment.

Figure 3:
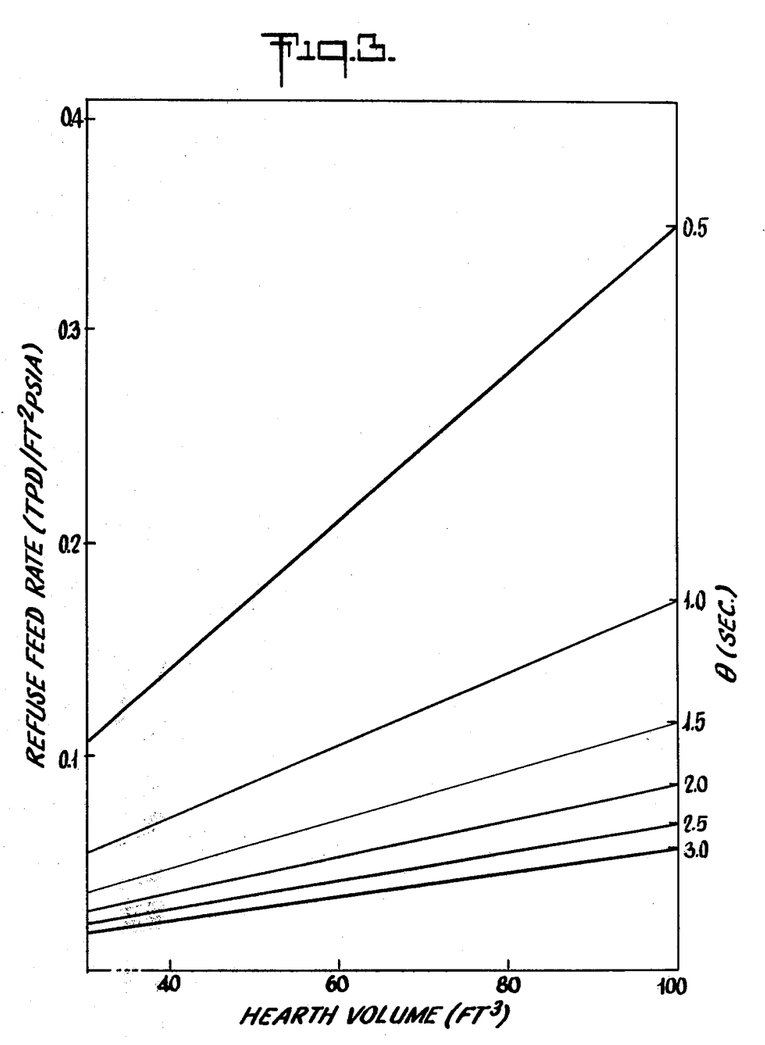
FIG. 3 is a graph illustrating the influence of pelletized refuse feed rate and hearth volume on the theoretical mean residence time for gases in the hearth.

The influence of the refuse processing rate (TPD/ft²/psia) and the hearth volume (ft³) on the theoretical expiration rate of the combustion product gases from the hearth is illustrated in FIG. 3. The expiration rate of the combustion product gas is not specifically plotted; instead, the mean residence time ($\theta$) of the gas within the hearth is used. However, by definition the mean residence time is inversely related to the gas expiration rate from the hearth (i.e., mean residence time is equal to the hearth gas volume divided by the gas expiration rate). Thus at any specific hearth volume, lower residence times are equivalent to higher expiration rates. Accordingly, high gas retention times are preferred and preferably the hearth is constructed in accordance with this invention so as to provide a theoretical mean gas retention time of at least two seconds. This limitation is reflected in the volume expression of Equation (1).

It should be understood however that the char carryover reduction improvement of this invention is not based solely on increased gas retention time in the hearth. This was demonstrated in a prior art Anderson type pelletized refuse disposal system in which the vertical shaft furnace was a cylinder 82.5 ft² cross-sectional area and 26 ft. high. The shaft-hearth opening connection was about 30 ft² cross-sectional area and the pelletized refuse/ft² shaft minimum cross-sectional area/second was 0.056, ie. $G_r$. The pellets were about 13 inches diameter in lengths of 6–12 inches. The hearth was in the shape of a truncated cone with a 4.8 ft. diameter floor supporting multiple piers having top surface 3 ft. above the floor and positioned such that the transverse distance between opposite piers was 28 inches. The shaft minimum operating pressure was 15 psia ($P_g$). The eight tuyeres were positioned in the lower part of the shaft 5.5 inches above the hearth floor in accordance with conventional blast furnace practice such that the d distance was 3 ft. and the h distance was 2.5 ft. (reference: FIG. 1). Accordingly, they were 83% of the vertical distance from the shaft-hearth connection middle to the hearth floor. Also, the tuyeres were oriented downwardly so that the $\alpha$ angle was 9 degrees (FIG. 1) and $\beta$ angle was 90 degrees (FIG. 2).

When operated at the pelletized refuse maximum feed rate of 0.056 lb. refuse/ft² shaft minimum cross-sectional area, this prior art Anderson demonstration system discharged excessive char in the overhead gaseous product, i.e., more than about 7% by weight of the refuse feed. It was determined that the theoretical mean gas retention time under these operating conditions was about 0.6 second. In an effort to reduce the char carryover, the pelletized refuse feed rate was reduced to about 0.028 lb. refuse/ft² shaft cross-sectional area/second, thereby increasing the theoretical mean gas retention time to about 1.2 seconds. Surprisingly, this did not substantially reduce the char carryover in the gaseous product and the char must be disposed of by means other than discharge to the atmosphere. It is expected that the present invention will permit reduction of the char carryover in the product gas to about 1% by weight of the feed refuse (dry basis).

The advantages provided by the present invention are most effectively utilized when the furnace is operated at an elevated pressure, as will be demonstrated by reference to FIG. 3. As discussed earlier, the principal function of the hearth is to provide a proper environment for combustion of the char produced during pyrolysis of the refuse, whereby sufficient heat is generated to melt the inorganic fraction of the refuse and drive the endothermic pyrolytic reactions occurring in the vertical shaft of the furnace. The present invention is able to efficiently provide these functions as a result of the improved hearth geometry and tuyere orientation.

According to FIG. 3, if the hearth is provided with a volume of 100 ft³, a refuse feed rate of 0.088 TPD/ft²/psia will result in a mean gas residence time of about 2 second. At an operating pressure of 15 psia, this performance corresponds to a specific throughput of 1.32 TPD/ft² whereas at an operating pressure of 65 psia, this performance corresponds to a specific throughput of 5.72 TPD/ft². The higher pressure operation provides a 333% increase in throughput corresponding directly to the pressure increase. The value of pressurization, however, can be most effectively utilized in a different manner. Instead of designing the pressurized hearth with the same volume as the 15 psia design, one can reduce the hearth volume. Although this design change will dictate a decrease in the specific throughput, it will have the advantageous effect of reducing the surface area and accordingly, the heat leak of the hearth. The lower heat leak permits higher temperature operation and significantly improves the conditions for both the combustion and melting functions of the hearth. For instance, if in the previous example the hearth volume is reduced to 80 ft³, the surface area of the hearth is reduced by 18%. Nonetheless, the specific throughput is still over 260% higher than in the 15 psia design.

Figure 4:
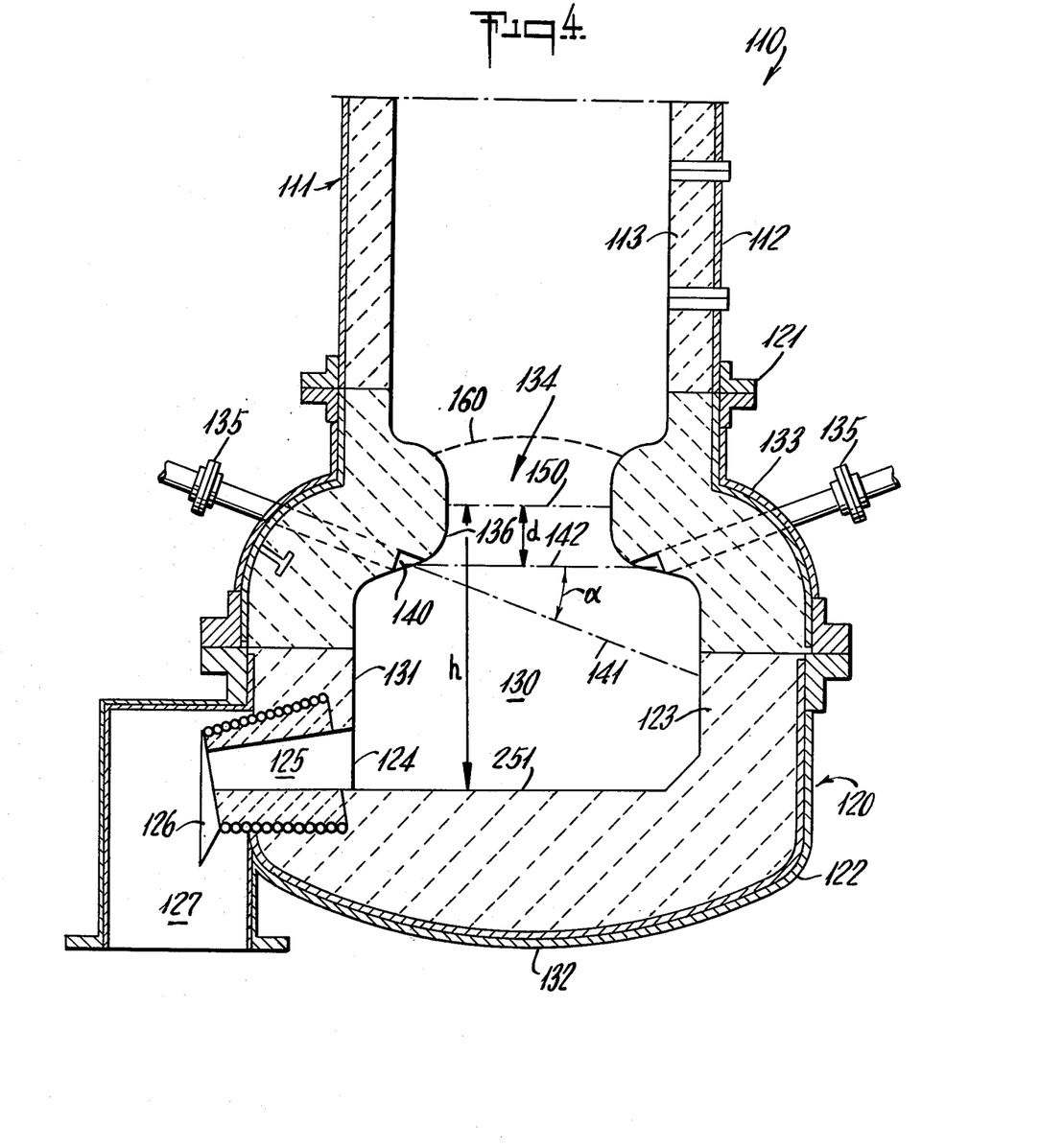
FIG. 4 is a vertical cross-sectional view of the lower portion of the shaft and hearth of another embodiment, constructed such that the pelletized bed is supported by the shaft-hearth opening connection.

Referring next to FIG. 4, another embodiment of the invention will be described. For comparison purposes, elements corresponding to those in FIG. 1 are assigned the same identification numeral plus 100. FIG. 4 differs from FIG. 1 with respect to the design of the restricted hearth opening connection 134, which separates the vertical shaft 111 from the hearth 120. Hearth opening connection 134 is in the form of an annular ring 161 of refractory material with the upper surface functioning as the inwardly sloped, lower portion of the vertical shaft. This annular ring 161 is contiguous with the refractory lining 123 of the hearth.

In the operation of furnace 110, the pelletized refuse charge is fed to the top of the vertical shaft 111 by means not shown. As the pelletized refuse descends through the shaft, it is successively dried and pyrolyzed by the hot gases issuing from the hearth 120. The still pelletized refuse bed 160 is supported above the hearth 120 by the annular ring 161. The latter provides the necessary bridging action to prevent unpyrolyzed material from falling into the hearth, while allowing the char residue to descend into the hearth for subsequent combustion. The heat generated by char combustion also serves to melt the inorganic fraction in the refuse bed 160 which falls to the hearth floor 151 and forms a slag pool. The molten slag is continuously tapped from the hearth through the tapping hole 124. The slag flows through the slag duct 125 over the slag weir 126 and falls through the slag discharge tube 127 for subsequent quenching.

By way of illustration, a furnace designed according to the FIG. 1 embodiment of this invention for processing 200 tons per day of 10 inch diameter and 6–12 inches long pelletized refuse may typically have a 22 ft. vertical cylindrical shaft with an inside diameter of about 8.25 ft. On this basis the $G_r$ value is 0.088 lb. refuse/ft² shaft cross-sectional area/second. The lower portion of the vertical shaft can be sloped inwardly at about a 25 degree angle so as to define a restricted hearth opening connection with a diameter of about 2.65 ft. The restricted opening may have a cylindrical shape with a height to diameter ratio of about 0.4. The base of the restricted hearth opening is flared outwardly into an enlarged hearth volume. The hearth is cylindrical in shape having a diameter of about 5.5 ft. and an enclosed volume of about 82 cu. ft. The hearth is operated at pressure of at least 57 psia (Pg). The hearth is provided with sixteen circumferentially spaced tuyeres. The tuyeres are located in the upper portion of the hearth adjacent to the restricted shaft-hearth opening connection at a plane d which is located approximately 23% of the vertical distance h through the hearth volume as measured from the midpoint of the restricted opening to the floor of the hearth. The tuyeres are inclined downwardly into the hearth volume in an approximately tangential orientation with respect to the restricted hearth opening connection. The tuyeres are inclined downwardly into the hearth volume at an angle α of 20 degrees.

Figure 5:
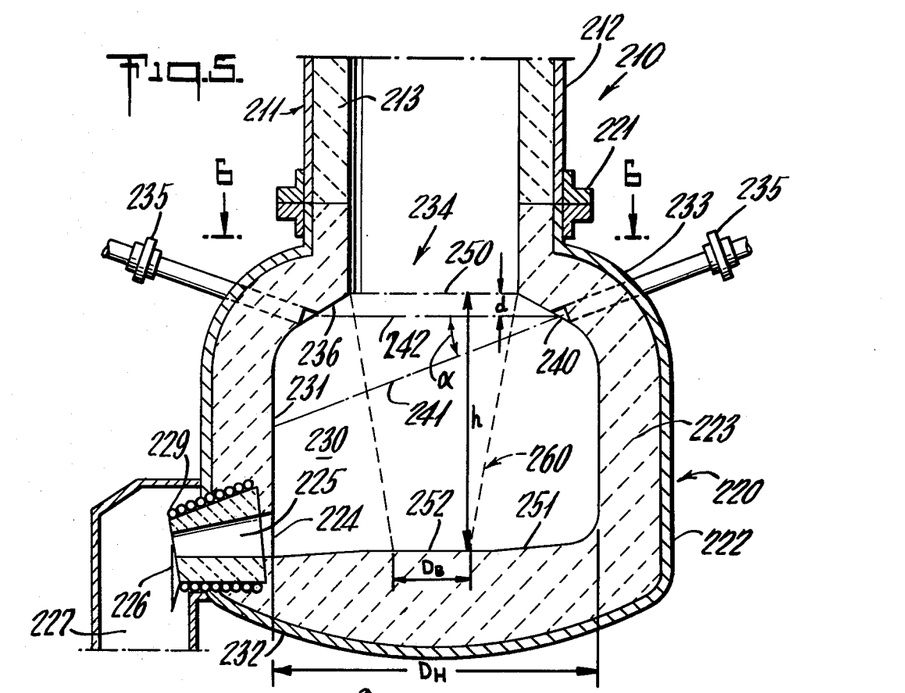
FIG. 5 is a vertical cross-sectional view of the lower portion of the shaft and hearth of a further embodiment, constructed such that the pelletized refuse bed is supported by the hearth floor.

FIG. 5 illustrates another embodiment of the invention, in which the shaft-hearth opening connection 234 is not of smaller cross-sectional area than shaft 211, but is simply the same size as the shaft lower end. The hearth 220 is provided with an enlarged annular volume 230 enclosed by vertical side wall 231, inwardly inclined dish-shaped ends 232 and 233 and the conically-shaped refuse bed 260. The latter is supported by the hearth floor 251, in contrast to the embodiments of FIGS. 1 and 4. An advantage of this construction is that the velocity of the rising gas (with char charryover) is not increased by flow through a restricted opening. A disadvantage is that portions of the pelletized bed 260 may break off and fall into the slag. If the practioner wishes to form the pelletized refuse bed on the hearth floor as illustrated in FIG. 5, the shaft opening connection minimum cross-sectional area is preferably between 0.7 and 1.0 times the shaft minimum cross-sectional area.

The upper dish-shaped end 233 of the hearth 220 is connected to vertical shaft 211 at the restricted hearth opening connection 234. In the upper region of the hearth volume 230, a plurality of tuyeres 235 are provided. The tuyeres are supplied with an oxygen-enriched gas from an appropriate oxygen header (not shown). Each tuyere 235 is positioned at circumferentially spaced-apart locations in the upper region of the hearth 220, adjacent to the opening connection 234. Tuyeres 235 are located in the upper end 236 of hearth 220, and inclined downwardly at an angle away from the opening connection 234. The angle of α inclination is preferably in the range of 10 to 45 degrees.

Figure 6:
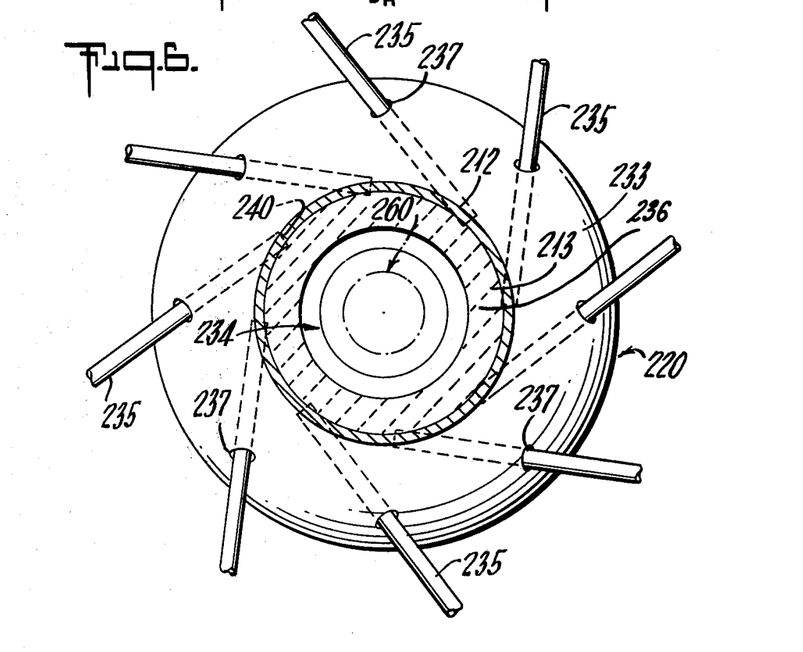
FIG. 6 is a plan view looking downwardly along line 5—5 of FIG. 5 illustrating in partial cross-section the tuyere location and orientation in the hearth.

All of the tuyeres 235 are positioned in an approximately tangential orientation with respect to connection 234, as illustrated in FIG. 6. As shown, the hearth is provided with eight circumferentially spaced tuyeres 235. Each tuyere 235 is directed downwardly and passes through an appropriately constructed opening 237 in the upper dish-shaped end 233 of the hearth 220. It should also be noted with respect to FIG. 5, that the tuyeres are positioned so as not to be fouled or plugged by any molten slag descending from the refuse column 260 supported or the hearth floor 252. The angle β in this embodiment is about 20 degrees.

Also as discussed earlier, this invention also requires that the hearth itself have a volume equal to or greater than that defined by Equation (1). In the FIGS. 5–6 embodiment, the hearth volume comprises the annular space bounded by the vertical side wall 231, the upper and lower dish-shaped ends, 233 and 232 respectively and the central, conically-shaped column of pelletized material illustrated by dash line 260, reduced by the volume occupied by the refractory material coating the inner wall of the hearth 220. This volume may be approximated by the Equation (2)

$$V = \frac{\pi h}{4} \left( D_H^2 - \frac{D_S^2}{3} - \frac{D_S D_B}{3} - \frac{D_B^2}{3} \right) \quad (2)$$

where h = the vertical distance from the shaft-hearth opening connection 234 (horizontal line 250) to the hearth floor 252, $D_H$ = the internal diameter of the hearth, $D_S$ = the shaft diameter (the diameter of the opening connection 234), and $D_B$ = the width of the column of pelletized material resting on the hearth floor 252.

Formula (2) assumes that the supported refuse bed 260 assumes a truncated conical shape. One of ordinary skill will understand how to compute the hearth volume if the column assumes a different shape.

Although preferred embodiments of the invention have been described in detail, it will be appreciated that other embodiments are contemplated along with modifications of the disclosed features as being within the scope of the invention.

What is claimed is:

1. In apparatus for disposing of pelletized refuse by conversion to useful gaseous product and inert solid residue, including a vertical shaft with an upper end for pelletized refuse providing a drying zone in the top section and a thermal decomposition zone in the intermediate section thereof to form a pelletized refuse bed, a hearth beneath said shaft and in flow communication with the lower end of said shaft, means for feeding oxygen-containing gas into said hearth as a combustion zone, and a tap hole communicating with said hearth for discharging molten residue therefrom, the improvement comprising:
   (a) a hearth volume V (ft$^3$) which is greater than that defined by the following equation:

$$V = 7.28 \times 10^2 G_r D_s^2 / P_g$$

where
   $G_r$ = pelletized refuse maximum feed rate (lb. refuse/ft$^2$ shaft minimum cross-sectional area/second),
   $D_s$ = shaft minimum equivalent diameter (ft) and
   $P_g$ = furnace pressure (psia).

(b) an opening connection between the shaft and the hearth having minimum cross-sectional area between 0.044 and 1.0 times the shaft minimum cross-sectional area,
   (c) a multiplicity of tuyeres as the means for feeding oxygen-containing gas into the hearth, each positioned at circumferentially spaced locations in the upper part of the hearth adjacent to the shaft-hearth connection (b) which are less than 35% of the vertical distance from the shaft-hearth connection (b) mid-point to the hearth floor, with
   (d) said tuyeres inclined downwardly and away from the shaft-hearth connection (b) and directed so that said oxygen-containing gas does not impinge directly against said pelletized refuse bed.

2. Apparatus according to claim 1 in which the average cross-sectional area of said hearth is between 0.7 and 3.2 times the square of the hearth height.

3. Apparatus according to claim 1 in which said tuyeres are oriented substantially tangentially to the shaft opening connection (b).

4. Apparatus according to claim 1 in which the shaft opening connection (b) minimum cross-sectional area is between 0.7 and 1.0 times the shaft minimum cross-sectional area such that said pelletized refuse bed is formed on the hearth floor.

5. Apparatus according to claim 1 in which said lower end of the shaft is sloped inwardly to form the shaft opening connection (b) with a minimum cross-sectional area between 0.075 and 0.2 times the shaft minimum cross-sectional area, such that said pelletized refuse bed is supported by said shaft opening connection.

6. Apparatus according to claim 1 wherein said tuyeres are downwardly inclined at inclination angle $\alpha$ of between 10 degrees and 45 degrees.

* * * * *